US012652257B2

(12) United States Patent
Tan et al.

(10) Patent No.: US 12,652,257 B2
(45) Date of Patent: Jun. 9, 2026

(54) SYSTEM AND METHOD FOR PROCESSING NETWORKING PACKETS USING A REORDER QUEUE

(71) Applicant: Microsoft Technology Licensing, LLC, Redmond, WA (US)

(72) Inventors: Tian Tan, Kirkland, WA (US); Anshuman Verma, Redmond, WA (US); Tushar Garg, Seattle, WA (US); Taylor Catherine Swanson, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 357 days.

(21) Appl. No.: 18/337,403

(22) Filed: Jun. 19, 2023

(65) Prior Publication Data

US 2024/0422106 A1 Dec. 19, 2024

(51) Int. Cl.
*H04L 47/62* (2022.01)

(52) U.S. Cl.
CPC .................................. *H04L 47/624* (2013.01)

(58) Field of Classification Search
CPC ...... G05F 9/5066; H04L 47/34; H04L 47/624
See application file for complete search history.

(56) References Cited

U.S. PATENT DOCUMENTS

| 9,430,239 | B2 | 8/2016 | Tu |
| 11,294,688 | B2 | 4/2022 | Krayden |

| 11,336,570 | B1 * | 5/2022 | K N ......................... H04L 45/42 |
| 11,456,951 | B1 * | 9/2022 | Wu ......................... H04L 45/566 |
| 2003/0065812 | A1 * | 4/2003 | Beier ..................... H04L 69/329 |
| | | | 709/236 |
| 2006/0056406 | A1 * | 3/2006 | Bouchard ............... H04L 12/56 |
| | | | 370/389 |
| 2010/0107174 | A1 * | 4/2010 | Suzuki ................... G06F 9/5033 |
| | | | 718/104 |
| 2014/0201761 | A1 * | 7/2014 | Dalal ................... G06F 13/4022 |
| | | | 718/108 |
| 2014/0369204 | A1 * | 12/2014 | Anand ................. H04L 67/1004 |
| | | | 370/235.1 |

(Continued)

OTHER PUBLICATIONS

International Preliminary Report on Patentability (Chapter I) received for PCT Application No. PCT/US2024/033331, mailed on Jan. 2, 2026, 08 pages.

(Continued)

*Primary Examiner* — Stephen J Clawson
(74) *Attorney, Agent, or Firm* — Barta Jones, PLLC

(57) ABSTRACT

A computerized method for processing packets in parallel using a reorder queue is described. As packets are received, it is determined which packet is the first packet in the flow. Once identified, the first packet in the flow, along with all other packets in the flow, is sent to the reorder queue while only a copy of the first packet in the flow is sent to a packet scheduler for processing on one of a plurality of processing cores. After the copy of the first packet in the flow is processed, the reorder queue releases each of the packets for the flow from the reorder queue in an order in which they were received. Thereafter, each of the packets released from the reorder queue are processed based on the processing of the copy of the first packet.

20 Claims, 4 Drawing Sheets

(56) References Cited

U.S. PATENT DOCUMENTS

| | | | |
|---|---|---|---|
| 2014/0369351 A1* | 12/2014 | Singh | H04L 12/18 |
| | | | 370/390 |
| 2016/0183163 A1* | 6/2016 | Yang | H04L 69/22 |
| | | | 370/328 |
| 2017/0264556 A1* | 9/2017 | Varga | H04L 47/2483 |
| 2020/0213232 A1* | 7/2020 | Srivastava | H04L 47/129 |
| 2020/0389408 A1* | 12/2020 | Gasparakis | H04L 41/044 |
| 2022/0116334 A1* | 4/2022 | Zhu | H04L 49/901 |
| 2022/0182309 A1* | 6/2022 | Bataineh | H04L 45/02 |
| 2023/0013110 A1* | 1/2023 | Singh | H04L 49/1523 |
| 2023/0073796 A1* | 3/2023 | Du | H04L 69/161 |
| 2024/0214323 A1* | 6/2024 | Cheng | H04L 47/32 |

OTHER PUBLICATIONS

International Search Report and Written Opinion received for PCT Application No. PCT/US2024/033331, mailed on Sep. 24, 2024, 15 pages.
Shen, et al., "ParaGraph: Subgraph-Level Network Function Composition With Delay Balanced Parallelism", IEEE Access, vol. 8, Nov. 2, 2020, pp. 199308-199322.

* cited by examiner

100

OFFLOAD ENGINE 101

PROCESSING CORE 112

PROCESSING CORE 112

PROCESSING CORE 112

PACKET SCHEDULER 110

UF CREATOR 114

SEQUENCE NUMBER TABLE 116

REORDER QUEUE 108

FILTER 102

PROCESSOR 104

MEMORY 105

FLOW TABLE 106

VIRTUAL MACHINE 118

NETWORK 120

200

SYSTEM AND METHOD FOR PROCESSING NETWORKING PACKETS USING A REORDER QUEUE

BACKGROUND

Data center Software Define Networking (SDN) requires complex packet processing and imposes stringent performance requirements for control path during connection establishment. After the connection establishment, a fast data-path operation can perform operations on packets. Processing packets in parallel is instrumental in achieving performance goals for control path: however, there are many challenges that arise when processing packets in parallel, such as load balancing, synchronization and ordering, consistency and stateful operations, scalability, and performance overhead. To address some of these challenges, conventional systems require additional processing in a networking stack and additional post processing, which may erode some or even all of the benefits parallel processing provides.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Example solutions for processing packets in parallel include: receiving a packet: determining that the packet is a first packet in a flow: based at least on determining that the packet is the first packet in flow, sending the packet to a reorder queue and sending a copy of the packet to a packet schedular; receiving an other packet: determining that the other packet is not the first packet in the flow; based at least on determining that the other packet is not the first packet in the flow, sending the other packet to the reorder queue without sending a copy of the other packet to the packet schedular: receiving an indication that the copy of the packet has been processed by a unified flow creator, the indication comprising a unified flow generated by the unified flow creator that includes information on how to process each packet in the flow based on the processing of the copy of the packet: receiving the packet from the reorder queue, the packet being released from the reorder queue based at least on the indication that the copy of the packet has been processed by the unified flow creator; receiving the other packet from the reorder queue, the other packet being released from the reorder queue based on the packet being released from the reorder queue; and processing the first packet and the other packet in the first flow based on the unified flow.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 4, the systems are illustrated as schematic drawings. The drawings may not be to scale. Any of the figures may be combined into a single example or embodiment.

DETAILED DESCRIPTION

Figure 1:
FIG. 1 is a block diagram illustrating an example system in accordance with some embodiments.

Aspects of the disclosure provide a system and method for processing packets in parallel using a reorder queue. To perform parallel packet processing in a software defined network (SDN), packet processors (e.g., processing cores) receive a packet along with a set of instructions to execute on that packet. To achieve high-throughput, and high utilization of various components in a pipeline, packet processors are designed as multi-threaded, for example, they can process multiple packets along with multiple instructions in various stages of the pipeline, simultaneously. When packets are processed in parallel, maintaining a correct order of the packets or ensuring synchronization between parallel processing units can be complex. This challenge is particularly important for protocols or applications that rely on strict packet ordering or synchronization. Since packets have to go through a variable length of programs (e.g., set of instructions), some packets may finish processing earlier than others packets. As such, packets can finish in an order different than they were received by the packet processors, resulting in out-of-order execution.

Further, distributing packet processing tasks evenly across multiple packet processors can be challenging. For example, conventional systems require that each packet in a flow be processed by the same packet processor and that each packet processor have their own queue. As used herein, a flow is a sequence of packets that share the same identification, such as a source and destination pair for MAC, IP address, and port number, known as networking tuples. Further, as the number of packet processors increases, scalability becomes a challenge. Coordinating and managing a large number of packet processors, distributing packets effectively, and avoiding bottlenecks require careful design and optimization to achieve high performance. Thus, ensuring that the workload is balanced efficiently to prevent resource bottlenecks and maximize throughput requires careful load balancing algorithms and mechanisms. As such, conventional systems introduce additional overhead due to coordination, synchronization, and communication required between the packet processors. Minimizing this overhead and optimizing performance is a challenge in designing efficient parallel packet processing algorithms.

The disclosure operates in an unconventional manner at least by utilizing a global buffer (e.g., a reorder queue) that stores all in-fight packets in a First-In-First-Out (FIFO) manner. The processing of the packets belonging to different connections happens in parallel and potentially in multiple offload processing engines. While processing time for each connection depends on the complexity of policies and may have different execution times resulting in an out-of-order completion, the systems and methods described herein restore/maintain the order while processing packets in parallel. For example, instead of processing each packet in a flow in sequence, only the first packet in a flow is processed initially by the offload processing engine. A sequence number table, inside the offload processing engine, stores results of the processing for the first packet of a flow. Further, to release all of the in-flight packets in the reorder queue that belong to the flow, the reorder queue waits until policy processing in an assigned processing core, as well as an any other co-engines (e.g., unified flow creator) are complete, and then, the reorder queue releases each packet in the flow to a filter for further processing in the order in which they were received by the re-order queue.

Accordingly, the system and methods described herein address an inherently technical problem of load balancing and accurately and efficiently maintaining an order of packets being processed in parallel, and provides a technical solution by reducing the number of packets being processed by the processing cores and utilizing a reorder queue to maintain the packets in an order that they were received. As such, the systems and methods described herein provide parallel processing that is more efficient, more scalable, uses less compute resources, and requires less processing to maintain a proper order of packets than conventional parallel processing systems and methods.

FIG. 1 is a block diagram illustrating an example system 100 configured for processing packets in parallel. The system 100 includes a filter 102. The filter 102 includes a processor 104, a memory 105, and a flow table 106. The memory 105 includes computer-executable instructions that can be executed by the processor 105 to perform the methods described herein. In some implementations, the computer-executable instructions 105 can comprise a plurality of software and/or hardware modules that are each configured to perform, or are for performing, individual or multiple steps of the method described herein. In some examples, the memory 105 is separate from the filter 102 and is an example of cloud storage accessible by the filter 102 over a network. In another example, the memory 105 may be part of a separate device to the other components of the system 100.

The system 100 further includes an offload engine 101 that includes a reorder queue 108, a packet scheduler 110, a plurality of processing cores 112, and a unified flow (UF) creator 114. When a packet is received by the filter 102 (e.g., from a virtual machine 118), the filter 102 determines whether the packet is a first packet from a flow. When the packet is determined to be the first packet from the flow, the filter 102 marks/tags the first packet as "the first packet", and any subsequent packet in the flow as "not the first packet". That is, when the filter 102 receives a second packet for the same flow, the filter 102 marks/tags the second packet, and any subsequent packets received that are part of the same flow, as "not the first packet". In one example, the filter 102 computes a packet hash and looks up a corresponding indirection table entry (IDE) based on the packet hash. In one example, the IDE maps a 49-bit flow hash value to a flow entry index (FEI) (e.g., position of a flow entry in the flow table). The state of the IDE must be Idle for the packet to be considered the first packet in a flow. When there is not a hash collision, for example, it is determined that the packet is the first packet in the flow, the filter 102 changes the state of the IDE from Idle to creating flow and sends the packet to the packet scheduler 110 marked/tagged with an indication that it is the first packet in the flow. In some examples, when consequent packets in the same flow are received by the filter 102 before the first packet is fully processed, the filter 102 computes a packet hash and accesses the IDE. These packets will see a state of the IDE as creating flow and the filter 102 knows they are not first packet for this hash and will send them to the reorder queue 108 marked/tagged as not the first packet.

As the filter 102 marks/tags received packets with an indication/identifier that it is either "the first packet" or "not the first packet", the filter 102 sends each of the packets to the reorder queue 108 in the order in which they were received by the filter 102. In addition to sending each of the received packets to the reorder queue 108, the filter 102 also sends a copy of the first packet of the flow to the packet scheduler 110. Thus, while each packet received by the filter 102 is sent to the reorder queue 108, in some examples, only a copy of the first packet from the flow is sent to the packet scheduler 110 to be scheduled on one of the plurality of processor cores 112 for processing.

In some examples, the packet scheduler 110 is able to schedule the copy of the first packet on a processing core from the plurality of processing cores 112 that is underutilized when compared to the other of the plurality of processing cores 112. That is, the packet scheduler 110 has knowledge of which of the plurality processing cores 112 have packets being executed thereon and which threads in each of processing cores of the plurality of processing cores 112 are processing packets. As such, the packet scheduler 110 has the ability to provide load balancing by assigning packets to particular threads in a particular processing core of the plurality of processing cores 112 to distribute workloads more evenly among the plurality of processing cores 112. In this example, the ability to provide load balancing is achieved based in part on the system 100 only sending a copy of the first packet from a packet flow to one of the plurality of processing cores 112 for processing in contrast to conventional systems that send each packet from the same flow to the same processing core for processing. As such, in some examples, unlike conventional systems, the system 100 is capable of utilizing 100% of the plurality of processing cores 112 at any given time given the flexibility the system 100 provides with respect to scheduling packets on the plurality of processing cores 112 as packets (e.g., from different flows) do not have to be processed in a particular order on the plurality of processing cores 112, while also reducing the latency that conventional systems have as are result of each packet in a flow being processed by the same processing core.

In some examples, after the packet scheduler 110 assigns the copy of the first packet in the flow (e.g., the packet marked/tagged by the filter 102 as being the first packet received for a particular flow), the packet scheduler 110 provides the reorder queue 108 with information (marks/tags) corresponding to which processing core from the plurality of processing cores 112 the copy of the first packet is being processed on, as well as information corresponding to which thread in the processing core the copy of the first packet is being processed on. In some examples, the packet scheduler 110 provides a core identifier (ID), which indicates the particular processing core from the plurality of processing cores 112 the packet scheduler 110 has assigned the copy of the first packet in the flow to, and a thread ID, which indicates which thread of the processing core the copy of the first packet is being processed on. That is, each of the plurality of processing cores 112 has, for example, eight threads. In this example, each of the plurality of processing cores 112 are thus able to handle eight packets at the same time. Thus, the core ID identifies which of the plurality of processing cores 112 the first packet in the flow is being processed on and the thread ID identifies which of the eight threads on the processing core the first packet in the flow is being process on. In some examples, the core ID and the thread ID are matched with each of the packets in the flow in the reorder queue 108, as explained in further detail below with respect to FIG. 2.

After the processing core of the plurality of processing cores 112 has completed the processing of the copy of the first packet, the UF creator 114 creates a unified flow for the flow corresponding to the copy of the first packet. In some examples, the unified flow includes all networking tuples of a flow in a condensed format. A fast data path operation uses the unified flow to process a packet without going through the complex control path operation required for connection establishment. In one example, the UF creator 114 includes a sequence number table 116 (e.g., reorder memory) that is indexed by the core ID and thread ID for each packet being processed by the plurality of processing cores 112. Further, whenever the UF creator 114 as created the unified flow for a particular packet, a value in the sequence table next to the core ID and thread ID of the particular packet is incremented by one. Thus, if the UF creator 114 has not created the unified flow for a packet and its corresponding flow, the entry corresponding to the core ID and the thread ID in the sequence number table 116 is still 0. In contrast, if the UF creator 114 has created the unified flow for a packet and its corresponding flow, the entry corresponding to the core ID and the thread ID in the sequence number table 116 is incremented from 0 to 1.

In one example, the reorder queue 108 polls the UF creator 114 to determine when the sequence number associated with a particular packet has incremented to 1 indicating the processing of the packet is complete and the packet can be released from the reorder queue 108. For example, when the copy of the first packet from the first flow is finished being processed by a processor core of the plurality of processing cores, the UF creator 114 creates the unified flow for the first flow based on the processing of the copy of the first packet. Thus, while the plurality of processing cores 112 and/or the UF creator 114 are completing their respective tasks, the reorder queue 108 is polling the plurality of the processing cores 112 and the UF creator 114 to determine if the processing has been completed. In one example, the plurality of processing cores 112 and the UF creator 114 each have a copy or each share the sequence number table 116. In another example, the UF creator 114 receives the core ID and the thread ID for each packet to enable the UF creator 114 can adjust the sequence number table 116 accordingly. As such, the reorder queue 108 pings the sequence number table 116 to determine a status of a particular packet, using the core ID and the thread ID of the particular packet. In one example, the reorder queue 108 pings the sequence number table 116 regarding a packet that is next to be released (e.g., the head of the reorder queue 108). The reorder queue 108 uses the core ID and the thread ID it received from the packet scheduler 110 for the first packet to ping the sequence number table 116.

Figure 2:
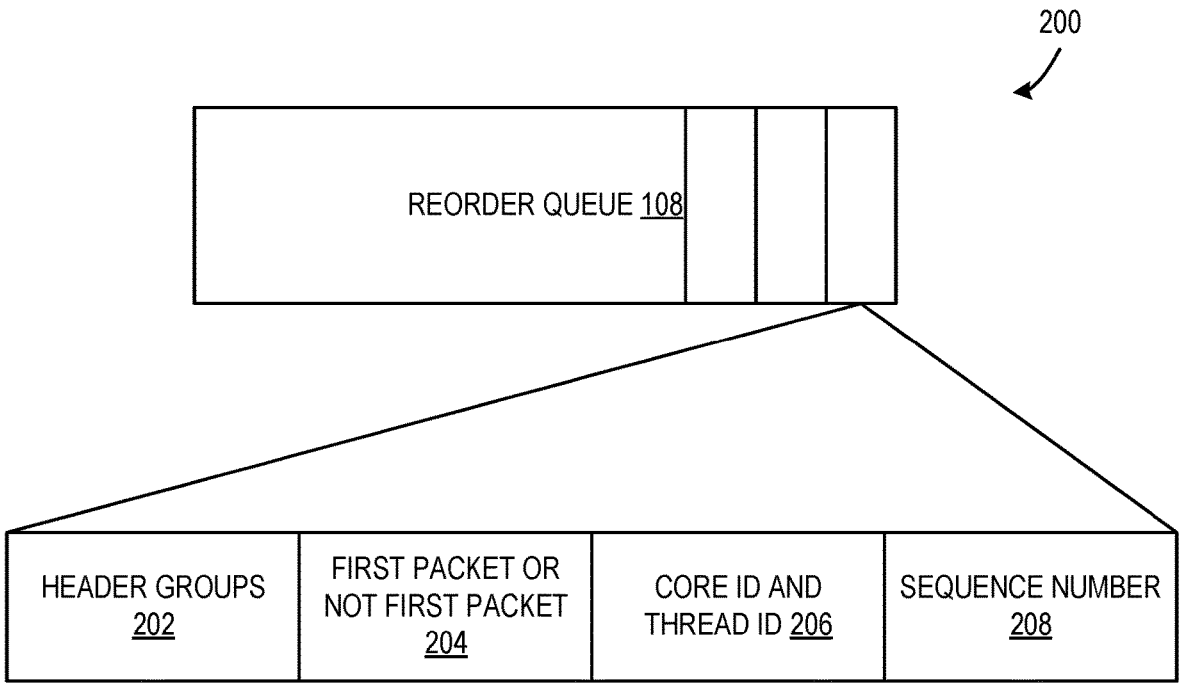
FIG. 2 is a block diagram illustrating exemplary information stored in the reorder queue for each packet.

With reference now to FIG. 2, a block diagram illustrating exemplary information stored in the reorder queue 108 for each packet is provided. More specifically, FIG. 2 represents a set of information that is saved for each packet in the reorder queue 108. For example, for each packet, the following information is saved in the reorder queue 108: each of the header groups 202, an indication/tag 204 that indicates whether the packet is the first packet in the flow or is not the first packet in the flow, the core ID and thread ID 206 that processed or is assigned to process the first packet in the flow, and a sequence number 208.

In some examples, when a packet at the head of the reorder queue 108 is the first packet (e.g., as indicated at 204), a check is made to ensure the process (e.g., performed by one of the plurality of processing cores 112 and the UF creator 114) is completed as the first packet from a flow should not be released from the reorder queue 108 until the UF creator 114 has created a corresponding flow. In other examples, other micro engines besides or in addition to the UF creator 114 are used to further process a packet. In either example, the reorder queue 108 releases the head packet (e.g., when the head packet is a first packet in a flow) when all processing by the micro engines is complete, and decrements a sequence table upon releasing the packet. Thus, when the reorder queue 108 polls the sequence number table 116 and it is determined that, for example, the first packet for the first flow has completed processing (e.g., the entry corresponding to the core ID and the thread ID in the sequence number table 116 is incremented from 0 to 1), the reorder queue 108 releases the first packet for the first flow from the reorder queue 108 and decrements the sequence table by one. In one example, after the first packet for the first flow is released from the reorder queue 108, the entry corresponding to the core ID and the thread ID in the sequence number table 116 for the first packet is decremented from 1 to 0. The next packet in line, which is now head of the reorder queue 108, is then reviewed to determine if it is the first packet or not the first packet. In one example, any packet in the reorder queue 108 that is the head of the reorder queue 108 and is not the first packet (as designated at 204), this packet is automatically released from the reorder queue 108. That is, if a packet at the head of the reorder queue 108 is identified as not the first packet, this means that the first packet has already been released from the reorder queue 108, and as such, all packets in the reorder queue 108 subsequent to the first packet can be released (e.g., in the order in which they were received, first in, first out).

In some examples, the filter 102 keeps a count of all packets for a particular flow that are sent to the reorder queue 108. As the packets are released from the reorder queue 108, the count of all of the packets for the particular flow decreases by one. Thus, when the count for the particular flow reaches zero, the filter 102 knows that all of the packets for a flow that were sent to the reorder queue 108 have been released. In some examples, an additional packet for a flow may be received by the filter 102 before the count for the flow reaches zero. In this example, if the count is greater than zero (e.g., not all packets for the flow have been released from the reorder queue 108, the filter 102 sends the newly received packet to the reorder queue 108, and the count is increased by one.

In one example, after the filter 102 receives each of the packets from the first flow from the reorder queue 108, the filter 102 processes each of the packets (e.g., including the first and second packets) based on the unified flow created by the UF creator 114 for the first flow. After each of the packets have been processed, the processed packets are sent to the their destination via the network 120.

Figure 3:
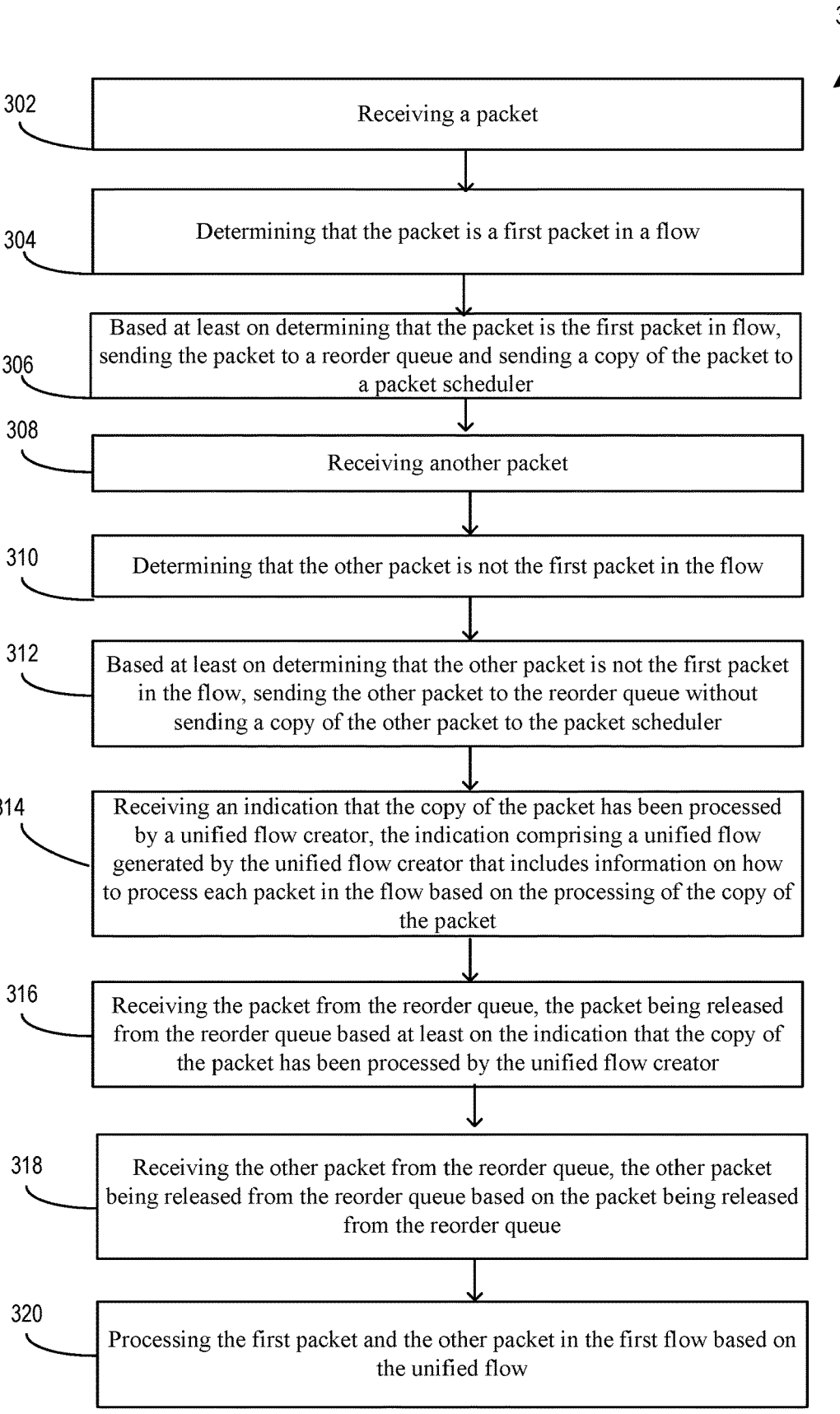
FIG. 3 is a flowchart illustrating an example method for processing packets in parallel using a reorder queue.

FIG. 3 is a flowchart illustrating an exemplary method 300 for processing packets in parallel using the reorder queue 108. In some examples, the method 300 is executed or otherwise performed by or in association with a system such as system 100 of FIG. 1.

At 302, a packet is received by the filter 102 from the virtual machine 118. At 304, the filter 102 determines that the packet is a first packet in a flow. In some examples, the filter 102 marks the first packet with an tag/identifier indicating that the first packet is in fact the first packet in the flow. At 306, based at least on determining that the packet is the first packet in flow, the filter 102 sends the packet to the reorder queue 108 and also sends a copy of the packet to the packet scheduler 110. At 308, the filter 102 receives another packet (e.g., a second packet), and determines, at 310 that the other packet is not the first packet in the flow. At 312, based at least on determining that the other packet is not the first packet in the flow, the filter 102 sends the other packet to the reorder queue 108. That is, unlike the first packet in the flow in which the filter 102 sends a copy of the first packet to the packet scheduler 110, the filter 102 does not send other a copy of the other packet in the flow to the packet scheduler 110. As such, after the filter 102 has marked/tagged a received packet with an indication/identifier that it is either "the first packet" or "not the first packet", the filter 102 sends each of the packets to the reorder queue 108 in the order in which they were received, but only a copy of the first packet in a flow is sent to the packet scheduler 110 for processing.

After the packet scheduler 110 receives the copy of the first packet from the filter 102, the packet scheduler 110 is able to schedule the copy of the first packet on a processing core from the plurality of processing cores 112. Further, since the packet scheduler 110 has knowledge of which of the plurality processing cores 112 have packets being executed thereon and which threads in each of processing cores of the plurality of processing cores 112 are processing the packets, the packet scheduler 110 has the ability to provide load balancing by assigning packets to particular threads in a particular processing core of the plurality of processing cores 112 to distribute workloads more evenly among the plurality of processing cores 112.

In some examples, after the packet scheduler 110 assigns the copy of the first packet in the flow (e.g., the packet marked/tagged by the filter 102 as being the first packet received for a particular flow), the packet scheduler 110 provides the reorder queue 108 with information (marks/tags) corresponding to which processing core from the plurality of processing cores 112 the copy of the first packet is being processed on, as well as information corresponding to which thread in the processing core the copy of the first packet is being processed on. In some examples, the packet scheduler 110 provides a core identifier (ID), which indicates the particular processing core from the plurality of processing cores 112 the packet scheduler 110 has assigned the copy of the first packet in the flow to, and a thread ID, which indicates which thread of the processing core the copy of the first packet is being processed on. In some examples, the core ID and the thread ID are matched with each of the packets in the flow in the reorder queue 108.

With reference back to FIG. 3, at 314, an indication that the copy of the packet has been processed is received by the filter 102 from the UF creator 114. The indication includes the unified flow that includes information on how to process each packet in the flow based on the processing of the copy of the packet. In some examples, the unified flow comprises encapsulated information on how to process each packet in the first flow. In one example, after the processing core of the plurality of processing cores 112 has completed the processing of the copy of the first packet, the UF creator 114 creates a unified flow for the flow corresponding to the copy of the first packet. Further, whenever the UF creator 114 as created the unified flow for a particular packet, the UF creator 114 increments a value in the sequence table next to the core ID and thread ID of the particular packet by one. Thus, if the UF creator 114 has not created the unified flow for a packet and its corresponding flow, the entry corresponding to the core ID and the thread ID in the sequence number table 116 is still 0. In contrast, if the UF creator 114 has created the unified flow for a packet and its corresponding flow, the entry corresponding to the core ID and the thread ID in the sequence number table 116 is incremented from 0 to 1.

In one example, the reorder queue 108 polls the UF creator 114 to determine when the sequence number associated with a particular packet has incremented to 1 indicating the processing of the packet is complete and the packet can be released from the re-order queue 108. For example, when the copy of the first packet from the first flow is finished being processed by a processor core of the plurality of processing cores, the UF creator 114 creates a unified flow for the first flow based on the processing of the copy of the first packet. While the plurality of processing cores 112 and/or the UF creator 114 are completing their respective tasks, the reorder queue 108 is polling the plurality of the processing cores 112 and the UF creator 114 to determine if the processing has been completed.

At 316, based on the indication that the copy of the packet has been processed, the reorder queue 108 releases the packet from the reorder queue 108 and it is received by the filter 102. At 318, after the first packet in the flow is released from the reorder queue 108 (e.g., based on receiving the packet from the reorder queue 108), the reorder queue 108 releases the other packet from the reorder queue 108, and the other packet is received by the filter 102 from the reorder queue 108. In one example, any packet in the reorder queue 108 that is the head of the reorder queue 108 and is not the first packet in the flow, this packet is automatically released from the reorder queue 108. That is, if a packet at the head of the reorder queue 108 is identified as not the first packet in the flow, this means that the first packet has already been released from the reorder queue 108, and as such, all packets in the reorder queue 108 subsequent to the first packet can be released (e.g., in the order in which they were received, first in, first out).

In one example, a packet for another flow is not released from the reorder queue 108 until all of the packets for the first flow are released from the reorder queue 108. In one example, if a third packet for the first flow is received by the filter 102 (e.g., from the virtual machine 118) before each of packets in the first flow are released from the reorder queue 108, the filter 102 sends the third packet to the reorder queue 108. However, if the third packet is received by the filter 102 after each of the packets for the first flow have been released from the reorder queue 108, the filter 102 processes the third packet based on the unified flow. In this example, the filter 102 would not send the third packet to the reorder queue 108 (or to the packet scheduler 110) and instead, would process the third packet.

In one example, prior to the filter 102 receiving, from the reorder queue 108, all of the packets for the first flow, the filter 102 receives an indication from the UF creator 114 that a first copy of a packet for a second flow has been processed. In some examples, the indication includes a second unified flow that includes information on how to process each packet in the second flow based on the processing of the first copy of the packet for the second flow. In this example, even though the indication that the first copy of the packet for the second flow has been processes is received, none of the packets for the second flow are released from the reorder queue 108 until all of the packets for the first flow are released from the reorder queue 108 (e.g., in first-in first-out order).

At 320, after the filter 102 has received each of the packets from the flow from the reorder queue 108 (e.g., after the reorder queue 108 has released each of the packets in the flow), the filter 102 processes each of the packets in the flow (e.g., including the first packet and the second packet)

according to the unified flow created by the UF creator 114. In some examples, after each of the packets in the flow have been processed, the processed packets are forwarded to their destination via the network 120.

Exemplary Operating Environment

Figure 4:
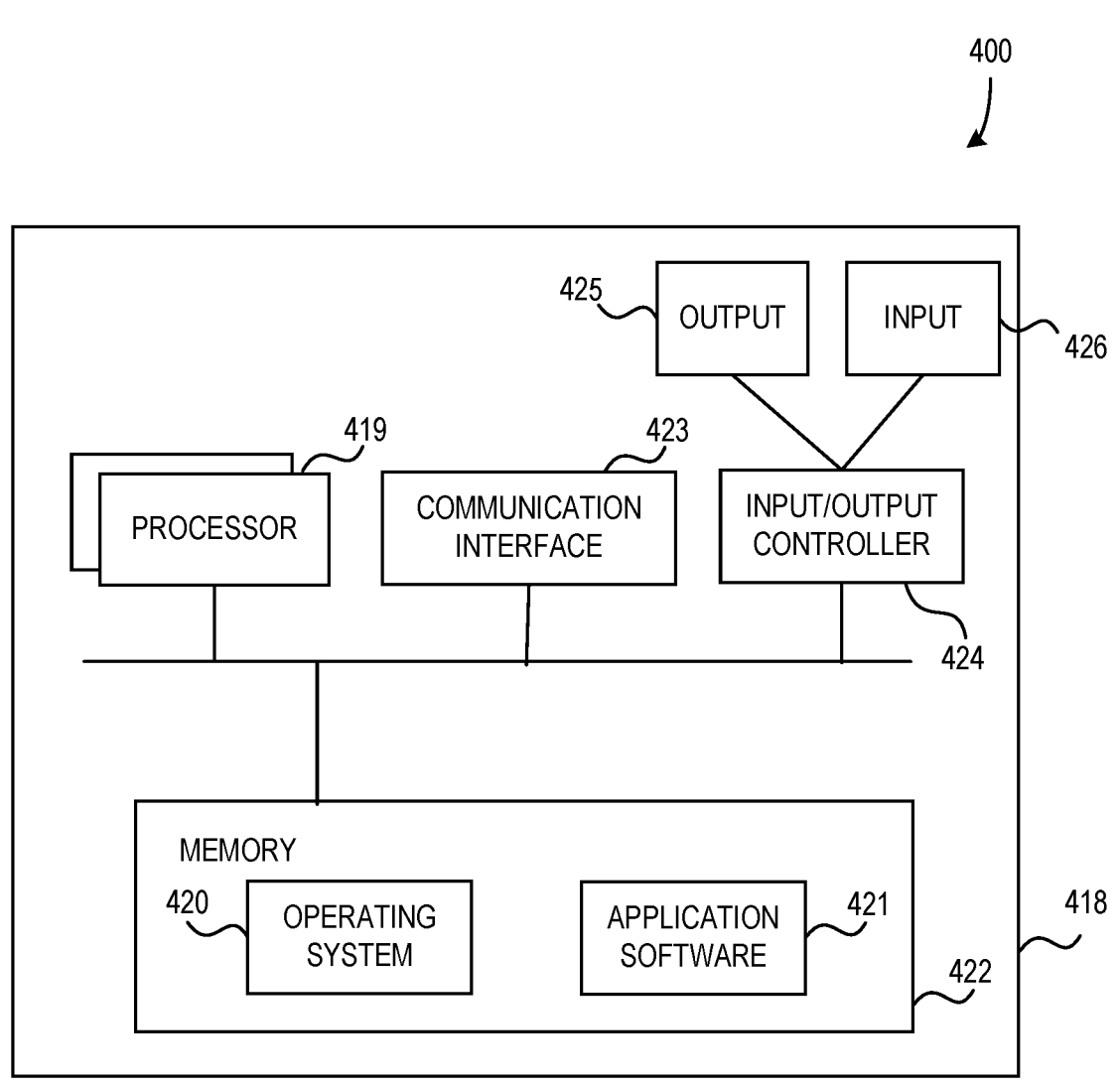
FIG. 4 illustrates an example computing apparatus as a functional block diagram.

The present disclosure is operable with a computing apparatus according to an embodiment as a functional block diagram 400 in FIG. 4. In an example, components of a computing apparatus 418 are implemented as a part of an electronic device (e.g., an electronic device that either includes or is connected to the computing device 102) according to one or more embodiments described in this specification. The computing apparatus 418 comprises one or more processors 419 which may be microprocessors, controllers, or any other suitable type of processors for processing computer executable instructions to control the operation of the electronic device. Alternatively, or in addition, the processor 419 is any technology capable of executing logic or instructions, such as a hard-coded machine. In some examples, platform software comprising an operating system 420 or any other suitable platform software is provided on the apparatus 418 to enable application software 421 to be executed on the device.

In some examples, computer executable instructions are provided using any computer-readable media that is accessible by the computing apparatus 418. Computer-readable media include, for example, computer storage media such as a memory 422 and communications media. Computer storage media, such as a memory 422, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 422) is shown within the computing apparatus 418, it will be appreciated by a person skilled in the art, that, in some examples, the storage is distributed or located remotely and accessed via a network or other communication link (e.g., using a communication interface 423).

Further, in some examples, the computing apparatus 418 comprises an input/output controller 424 configured to output information to one or more output devices 425, for example a display or a speaker, which are separate from or integral to the electronic device. Additionally, or alternatively, the input/output controller 424 is configured to receive and process an input from one or more input devices 426, for example, a keyboard, a microphone, or a touchpad. In one example, the output device 425 also acts as the input device. An example of such a device is a touch sensitive display. The input/output controller 424 may also output data to devices other than the output device, e.g., a locally connected printing device. In some examples, a user provides input to the input device(s) 426 and/or receives output from the output device(s) 425.

The functionality described herein can be performed, at least in part, by one or more hardware logic components. According to an embodiment, the computing apparatus 418 is configured by the program code when executed by the processor 419 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example method comprises: receiving a packet: determining that the packet is a first packet in a flow: based at least on determining that the packet is the first packet in flow, sending the packet to a reorder queue and sending a copy of the packet to a packet schedular; receiving another packet: determining that the other packet is not the first packet in the flow: based at least on determining that the other packet is not the first packet in the flow, sending the other packet to the reorder queue without sending a copy of the other packet to the packet scheduler: receiving an indication that the copy of the packet has been processed by a unified flow creator, the indication comprising a unified flow generated by the unified flow creator that includes information on how to process each packet in the flow based on the processing of the copy of the packet: receiving the packet from the reorder queue, the packet being released from the reorder queue based at least on the indication that the copy of the packet has been processed by the unified flow creator; receiving the other packet from the reorder queue, the other packet being released from the reorder queue based on the packet being released from the reorder queue; and processing the first packet and the other packet in the first flow based on the unified flow.

An example system comprises: a filter; and an offload engine comprising a scheduler, a plurality of processing cores, a unified flow creator, and a reorder queue: the filter configured to: receive a packet: determine that the packet is a first packet in a flow; based at least on determining that the packet is the first packet in flow: send a copy of the packet to the packet schedular for scheduling a processing of the packet on one of the plurality of processing cores; and send the packet to the reorder queue: receive another packet; determine that the other packet is not the first packet in the flow: based at least on determining that the other packet is not the first packet in the flow, send the other packet to the reorder queue without sending a copy of the other packet to the packet scheduler: receive, from the unified flow creator, an indication that the copy of the packet has been processed by the unified flow creator, the indication comprising a unified flow created by the unified flow creator, the unified flow comprising information on how to process each packet in the first flow based on the processing of the packet: receive the packet from the reorder queue, the packet being released from the reorder queue based at least on the indication that the copy of the packet has been processed by the unified flow creator: receive the other packet from the reorder queue, the other packet being released from the reorder queue based on the packet being released from the reorder queue; and process the packet and the other packet based on the unified flow.

An example computer-readable medium comprising computer-executable instructions that, when executed by a processor, cause the processor to perform the following operations: receiving a packet: determining that the packet is a first packet in a flow; based at least on determining that the packet is the first packet in flow, sending the packet to a reorder queue and sending a copy of the packet to a packet schedular; receiving another packet; determining that the other packet is not the first packet in the flow: based at least on determining that the other packet is not the first packet in the flow, sending the other packet to the reorder queue without sending a copy of the other packet to the packet scheduler: receiving an indication that the copy of the packet has been processed by a unified flow creator, the indication comprising a unified flow generated by the unified flow creator that includes information on how to process each packet in the flow based on the processing of the copy of the packet: receiving the packet from the reorder queue, the packet being released from the reorder queue based at least on the indication that the copy of the packet has been processed by the unified flow creator: receiving the other packet from the reorder queue, the other packet being released from the reorder queue based on the packet being released from the reorder queue; and processing the first packet and the other packet in the first flow based on the unified flow.

Alternatively, or in addition to the other examples described herein, examples include any combination of the following:

wherein no copy of any other packet in the flow is sent to the packet scheduler;

wherein the unified flow comprises encapsulated information on how to process each packet in the first flow;

further each packet in the first flow is received, from the reorder queue, based on a first in first out order after receiving the packet for the first flow from the reorder queue;

wherein a copy of a packet for another flow is not received, from the reorder queue, until all copies of packets for the first flow are received from the reorder queue.

prior to receiving, from the reorder queue, all copies of the packets for the first flow, receiving an indication that a first copy of a packet for another flow has been processed, the indication comprising a another unified flow that includes information on how to process each packet in the other flow based on the processing of the first copy of the packet for the other flow;

further comprising:

after receiving the packet and the other packet from the reorder queue, receiving a third packet for the first flow; and processing the third packet for the first flow based on the unified flow; and wherein the third packet is processed without sending the third packet to the reorder queue and without sending a copy of the third packet to the packet scheduler.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for based on the query, selecting a website: exemplary means for identifying a plurality of media on the website: exemplary means for based at least on the query, selecting a portion of the plurality of media on the website: exemplary means for extracting content from each of the selected portion of the plurality of media based on the query: exemplary means for generating semantic summaries of the extracted content; exemplary means for aggregating the semantic summaries into an aggregated semantic summary; and exemplary means for providing the aggregated semantic summary to the user.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

receiving a packet;

determining that the packet is a first packet in a first flow;

based at least on determining that the packet is the first packet in the first flow, sending the packet to a reorder queue and sending a copy of the packet to a packet scheduler;

receiving an other packet;

determining that the other packet is not the first packet in the first flow;

based at least on determining that the other packet is not the first packet in the first flow, sending the other packet to the reorder queue without sending a copy of the other packet to the packet scheduler;

receiving an indication that the copy of the packet has been processed by a unified flow creator, the indication comprising a unified flow generated by the unified flow creator that includes information on how to process each packet in the first flow based on the processing of the copy of the packet;

receiving the packet and the other packet for the first flow in a first in first out order from the reorder queue, the packet being released from the reorder queue based at least on the indication that the copy of the packet has been processed by the unified flow creator; and processing the first packet and the other packet in the first flow based on the unified flow and an order in which they are received from the reorder queue.

2. The method of claim 1, wherein no copy of any other packet in the flow is sent to the packet scheduler.

3. The method of claim 1, wherein the unified flow comprises encapsulated information on how to process each packet in the first flow.

4. The method of claim 1, wherein each packet in the first flow is received, from the reorder queue, based on the first in first out order after receiving the packet for the first flow from the reorder queue.

5. The method of claim 4, wherein a copy of a packet for another flow is not received, from the reorder queue, until all copies of packets for the first flow are received from the reorder queue.

6. The method of claim 5, further comprising:

prior to receiving, from the reorder queue, all copies of the packets for the first flow, receiving an indication that a first copy of a packet for another flow has been processed, the indication comprising a another unified flow that includes information on how to process each packet in the other flow based on the processing of the first copy of the packet for the other flow.

7. The method of claim 1, further comprising:

after receiving the packet and the other packet from the reorder queue, receiving a third packet for the first flow; and processing the third packet for the first flow based on the unified flow.

8. The method of claim 7, wherein the third packet is processed without sending the third packet to the reorder queue and without sending a copy of the third packet to the packet scheduler.

9. A system comprising:

a filter; and an offload engine comprising a scheduler, a plurality of processing cores, a unified flow creator, and a reorder queue;

the filter configured to:

receive a packet;

determine that the packet is a first packet in a first flow;

based at least on determining that the packet is the first packet in the first flow:

send a copy of the packet to the packet scheduler for scheduling a processing of the packet on one of the plurality of processing cores; and send the packet to the reorder queue;

receive another packet;

determining that the other packet is not the first packet in the first flow;

based at least on determining that the other packet is not the first packet in the first flow, sending the other packet to the reorder queue without sending a copy of the other packet to the packet scheduler;

receiving, from the unified flow creator, an indication that the copy of the packet has been processed by the unified flow creator, the indication comprising a unified flow created by the unified flow creator, the unified flow comprising information on how to process each packet in the first flow based on the processing of the packet;

receiving the packet and the other packet for the first flow in a first in first out order from the reorder queue, the packet being released from the reorder queue based at least on the indication that the copy of the packet has been processed by the unified flow creator; and processing the packet and the other packet based on the unified flow and an order in which they are received from the reorder queue.

10. The system of claim 9, wherein no copy of any other packet in the first flow is sent to the packet scheduler.

11. The system of claim 9, wherein the unified flow comprises encapsulated information on how to process each packet in the first flow.

12. The system of claim 9, wherein the reorder queue releases, to the filter, each packet in the first flow in the first in first out order after releasing the packet for the first flow.

13. The system of claim 12, wherein the reorder queue does not release a packet for another flow until all packets for the first flow in the reorder queue are released from the reorder queue.

14. The system of claim 12, where the filter is further configured to:

prior to receiving, from the reorder queue, all copies of the packets for the first flow, receive an indication from the unified flow creator that another unified flow has been created based on a processing of a copy of a first packet for another flow, the other unified flow comprising information on how to process each packet in the other flow;

wherein the reorder queue does not release the first packet for the other flow until all copies of packets for the first flow in the reorder queue are released from the reorder queue.

15. The system of claim 9, wherein the filter is further configured to:

after receiving, from the reorder queue, the packet and the other packet, receiving a third packet for the first flow; and processing the third packet for the first flow based on the unified flow; and wherein the third packet is processed without sending a copy of the third packet to the packet scheduler and without sending the packet to the reorder queue.

16

16. A computer-storage medium comprising computer-executable instructions that, when executed by a processor, cause the processor to perform the following operations:

receiving a packet;

determining that the packet is a first packet in a first flow;

based at least on determining that the packet is the first packet in the first flow, sending the packet to a reorder queue and sending a copy of the packet to a packet scheduler;

receiving another packet;

determining that the other packet is not the first packet in the first flow;

based at least on determining that the other packet is not the first packet in the first flow, sending the other packet to the reorder queue without sending a copy of the other packet the reorder queue;

receiving an indication that the copy of the packet has been processed by a unified flow creator, the indication comprising a unified flow generated by the unified flow creator that includes information on how to process each packet in the first flow based on the processing of the copy of the packet;

receiving the packet and the other packet for the first flow in a first in first out order from the reorder queue, the packet being released from the reorder queue based at least on the indication that the copy of the packet has been processed by the unified flow creator; and processing the first packet and the other packet in the first flow based on the unified flow and an order in which they are received from the reorder queue.

17. The computer-storage medium according to claim 16, wherein no copy of any other packet in the flow is sent to the packet scheduler.

18. The computer-storage medium according to claim 16, wherein the unified flow comprises encapsulated information on how to process each packet in the first flow.

19. The computer-storage medium according to claim 16, wherein a packet for another flow is not received, from the reorder queue, until all packets for the first flow are received from the reorder queue.

20. The computer-storage medium according to claim 16, wherein after receiving, from the reorder queue, the packet and the other packet, a third packet for the first flow is received; and wherein the computer-executable instructions further cause the processor to process the third packet for the first flow based on the unified flow; and wherein the third packet is processed without sending a copy of the third packet to the packet scheduler and without sending the third packet to the reorder queue.

* * * * *